(12) United States Patent
Lin

(10) Patent No.: US 8,534,171 B2
(45) Date of Patent: Sep. 17, 2013

(54) ULTRA-PRECISION MACHINING SYSTEM

(75) Inventor: Yu-An Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 276 days.

(21) Appl. No.: 12/972,524

(22) Filed: Dec. 20, 2010

(65) Prior Publication Data

US 2012/0006162 A1   Jan. 12, 2012

(30) Foreign Application Priority Data

Jul. 9, 2010   (TW) ................................ 99122778 U

(51) Int. Cl.
*B23B 19/00* (2006.01)
*B23Q 1/70* (2006.01)
(52) U.S. Cl.
CPC ....................................... *B23Q 1/70* (2013.01)
USPC ............................................. 82/118; 82/142
(58) Field of Classification Search
USPC ................... 82/118, 134, 905, 142; 700/174, 700/175, 176, 177; 359/329
See application file for complete search history.

(56) References Cited

U.S. PATENT DOCUMENTS

| | | | |
|---|---|---|---|
| 3,744,353 A * | 7/1973 | Rohs ................................ 82/118 |
| 4,131,837 A * | 12/1978 | Whetham ...................... 318/571 |
| 4,254,676 A * | 3/1981 | Wilson ............................. 82/152 |
| 4,417,816 A * | 11/1983 | Kindl et al. .................... 356/487 |
| RE33,910 E * | 5/1992 | Compton .......................... 82/18 |
| 5,255,199 A * | 10/1993 | Barkman et al. ............... 700/175 |
| 5,361,470 A * | 11/1994 | Hamada et al. ............... 29/27 R |
| 5,816,122 A * | 10/1998 | Benning et al. ................ 82/1.11 |
| 6,471,451 B2 * | 10/2002 | Kojima et al. ................. 409/131 |
| 2003/0204287 A1* | 10/2003 | Shirakawa et al. ........... 700/193 |
| 2005/0224475 A1* | 10/2005 | Nomaru ................... 219/121.82 |
| 2005/0276467 A1* | 12/2005 | Chen ............................. 382/152 |
| 2009/0244550 A1* | 10/2009 | Fujishima et al. ............ 356/614 |

* cited by examiner

*Primary Examiner* — Daniel Howell
*Assistant Examiner* — Alan Snyder
(74) *Attorney, Agent, or Firm* — Altis Law Group, Inc.

(57) ABSTRACT

An ultra-precision machining system includes a worktable, a first support device, a second support device, a rotating shaft, a cutting tool, a detector and a controller. The first support device is fixed on the worktable. The second support device is movably mounted on the worktable. The rotating shaft is rotatably connected to the first support device. The cutting tool is mounted on the second support device and is movable relative to the second support device along a vertical direction. The detector is fixedly connected to the first support device above the rotating shaft for detecting an axial deviation of the rotating shaft. The controller is configured for calculating the axial deviation of the rotating shaft and adjusting the position of the cutting tool relative to the rotating shaft to counteract the calculated axial deviation of the rotating shaft.

8 Claims, 4 Drawing Sheets

ULTRA-PRECISION MACHINING SYSTEM

BACKGROUND

1. Technical Field

The present disclosure relates to machining system, and particularly, relates to an ultra-precision machining system.

2. Description of Related Art

In the ultra-precision machining field, it is important to align a workpiece to a cutting tool. For example, when machining a lens mold core for a mold, first, the workpiece should be fixed on a rotating shaft, second, the workpiece is aligned with a cutting tool. Then the rotating shaft drives the workpiece to rotate around a central axis, and at the same time, the cutting tool is driven to move along a horizontal direction parallel to the central axis of the rotating shaft and a vertical direction perpendicular to the central axis for machining the workpiece to be a lens mold core. If the relative positions of the workpiece and the cutting tool are deviated from a predetermined value, an error of the shape and precision of the lens mold core may occur. In particular, if the deviation between the workpiece and the cutting tool occurs along a vertical direction, a micro-convex portion will be formed on the surface of the lens mold core. The micro-convex portion cannot easily be found by naked eye, but the quality of a lens molded by the lens mold core will be decreased because of the micro-convex portion.

During a machining process, the rotating shaft is generally needed to rotate under a high temperature for a long time, thus the rotating shaft may be deviated along a vertical direction relative to an original value, which may produce a micro-convex portion on the lens mold core.

What is needed therefore is an ultra-precision machining system and machining method addressing the above-mentioned problems.

BRIEF DESCRIPTION OF THE DRAWINGS

The components of the drawings are not necessarily drawn to scale, the emphasis instead being placed upon clearly illustrating the principles of the disclosure of the ultra-precision machining system and machining method. Moreover, in the drawings, like reference numerals designate corresponding parts throughout several views.

DETAILED DESCRIPTION

Figure 1:
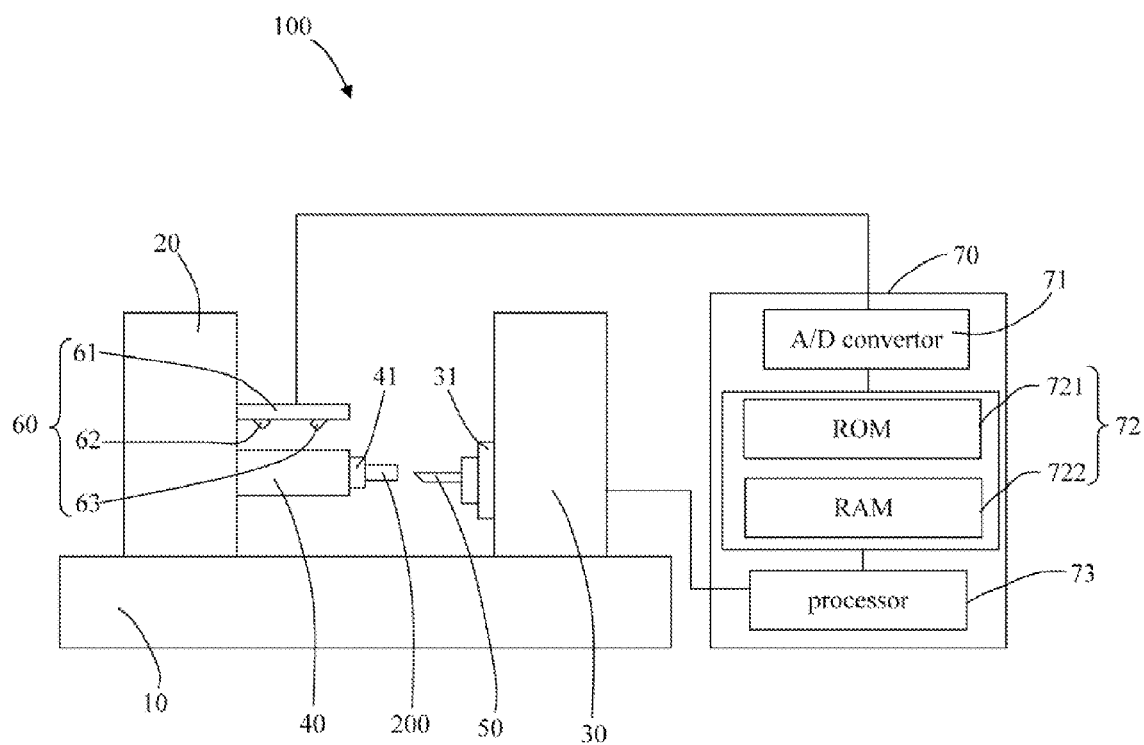
FIG. 1 is a schematic view of an ultra-precision machining system according to an exemplary embodiment of the present disclosure.
Figure 2:
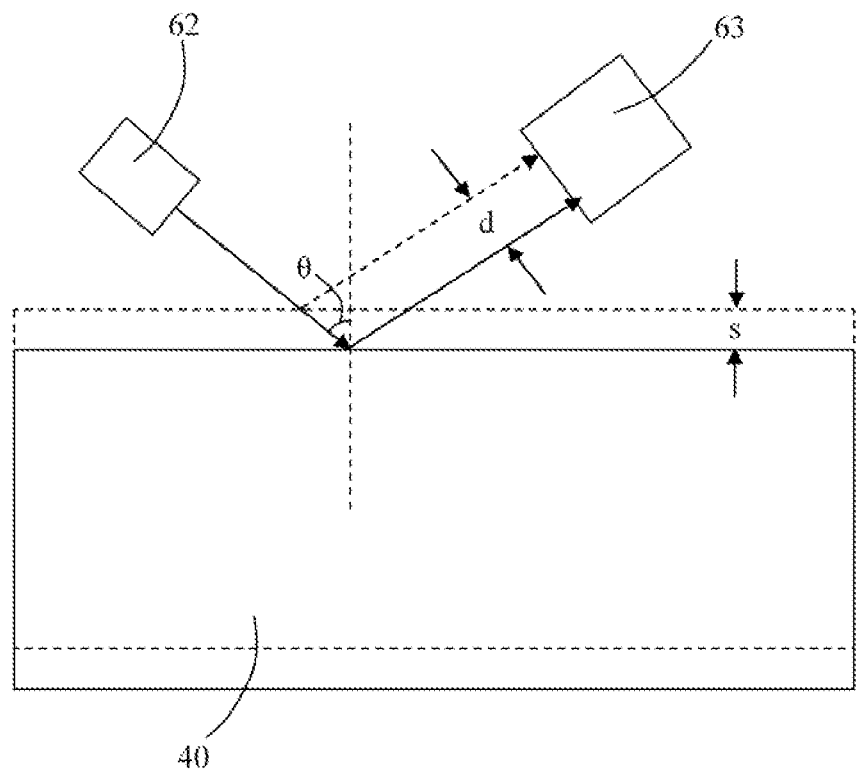
FIG. 2 is a schematic view of a detector of the ultra-precision machining system of FIG. 1.

Referring to FIGS. 1-2, an ultra-precision machining system 100, according to an exemplary embodiment, is shown. The ultra-precision machining system 100 includes a worktable 10, a first support member 20, a second support member 30, a rotating shaft 40, a cutting tool 50, a detector 60 and a controller 70.

The first support member 20 is fixed on the worktable 10, and the second support member 30 is movably mounted on the worktable 10. In this embodiment, the second support device 30 is movable toward or away from the first support device along a horizontal direction. The second support member 30 includes an adjusting block 31 mounted thereon; and the position of the adjusting block 31 can be adjusted on the second support member 30 along a vertical direction, i.e., along a height direction of the second support member 30.

The rotating shaft 40 is rotatably mounted on the first support member 20. A distal end of the rotating shaft 40 is opposite to (i.e., face towards) the second support member 30. The rotating shaft 40 includes a holding block 41 on the distal end thereof.

The cutting tool 50 is fixed on the fixing block 31 of the second support member 30.

The detector 60 is fixed on the first support member 20 above the rotating shaft 40. The detector 60 includes a supporting arm 61, a light emitting device 62 and a light receiving device 63. An end of the supporting arm 61 is fixed on the first support member 20, and the light emitting device 62 and the light receiving device 63 are fixed on the fixing arm 61. A signal emitting direction of the light emitting device 62 is inclined relative to the central axis of the rotating shaft 40, an incident angle θ of the signal is more than zero and less than 90 degrees. The light receiving device 63 is positioned on a transmitting path of the signal reflected by the rotating shaft 40. In this embodiment, the light emitting device 62 is a laser generator and can emit laser as a detecting signal to the rotating shaft 40. The light receiving device 63 is an optical sensor that can generate an analog signal associated with the laser emitted by the light emitting device 31 reflected by the rotating shaft 40, such as a CCD (Charge Coupled Device) or CMOS (Complementary Metal Oxide Semiconductor).

The controller 70 includes an A/D convertor 71, a storage 72 and a processor 73. The A/D convertor 71 is configured for converting analog signal (electrical signal generated by the light receiving device 63) to digital signal. The storage 72 includes a RAM (Random-Access Memory) 721 and a ROM (Read-Only Memory) 722. The RAM 721 is configured for storing the digital signal converted by the A/D convertor 71 and the calculated deviation results. The ROM 722 is configured for storing predetermined information, in this embodiment, the predetermined information includes a program for calculating the deviation of the rotating shaft 40. The processor 73 is configured for calculating the deviation of the rotating shaft 40 based on the digital signal stored in the RAM 721.

In application, a workpiece 200 to be machined is held by the holding block 41 of the rotating shaft 40; the cutting tool 50 is aligned with a machining center of the workpiece. After that, the position of the rotating shaft 40 is recorded by the controller 70 and is shown as an original position. Then the rotating shaft 40 drives the workpiece to rotate at a high speed, the second support member 30 drives the cutting tool 50 to move along a horizontal direction parallel with the central axis of the rotating shaft 40 and/or a vertical direction perpendicular to the central axis of the rotating shaft 40. In such manner, the cutting tool 50 machines the workpiece 200 to be a lens mold core. The movement path of the cutting tool 50 is controlled by a predetermined program.

During the machining process, the detector 60 is started to detect the position changes of the rotating shaft relative to the original position. The detector 60 can be started during the machining process, or the detector 60 can be started after a predetermined length of time. Referring to FIG. 2, when the detector 60 is started, the light emitting device 62 emits signal to the rotating shaft 40 at a predetermined incidence angle θ. The signal emitted by the light emitting device 62 is reflected by rotating shaft 40, then the reflected signal are received by the light receiving device 63. If the axis of the rotating shaft 40 is deviated along a vertical direction, the position of the signal projected on the sensing area of the light receiving device is correspondingly deviated for a distance d. The distance d can be calculated by the processor 73 of the controller 70, and then the radial deviation s of the rotating shaft 40 in the vertical direction can be calculated by the processor 73 according to the incidence angle θ of the signal and the distance d.

Base on the calculated radial deviation of the rotating shaft 40, the processor 73 sends a driving order to the second support device 30, then the adjusting block 31 is driven to carry the cutting tool to move a distance the same as the value and the direction of the radial deviation s. Thus error of shape and precision of the workpiece can be corrected in time. Therefore, the quality of the machined lens mold core is increased. In this embodiment, the adjusting block 31 is driven by a linear motor (not shown).

Figure 3:
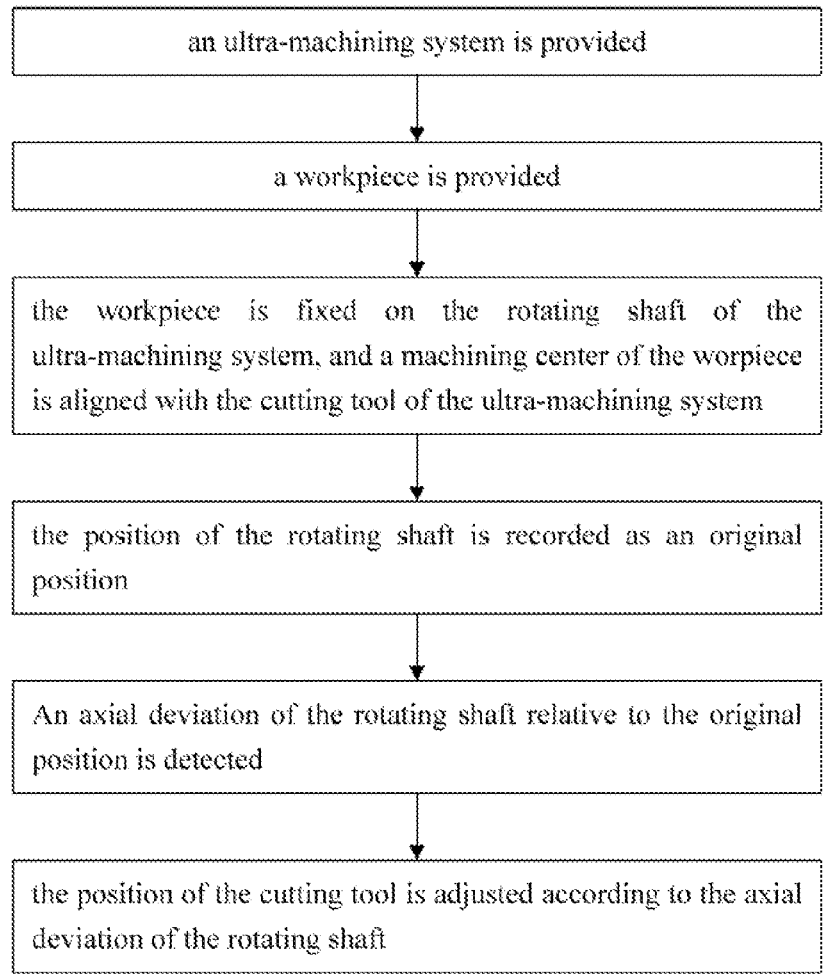
FIG. 3 is a flowchart of an ultra-precision machining method according to an exemplary embodiment of the present disclosure.

Referring to FIG. 3, a flowchart of an ultra-machining method, according to an exemplary embodiment, is shown. The ultra-machining method includes following steps.

First, an ultra-machining system 100 as above described and a workpiece 200 are provided.

Second, the workpiece 200 is fixed on the rotating shaft 40 of the ultra-machining system 100, and a machining center of the workpiece 200 is aligned with the cutting tool 50 of the ultra-machining system 100.

Third, the position of the rotating shaft 40 is recorded as an original position;

Fourth, a radial deviation of the rotating shaft 40 relative to the original position is detected.

Fifth, the position of the cutting tool 50 is adjusted according to the radial deviation of the rotating shaft 40.

Figure 4:
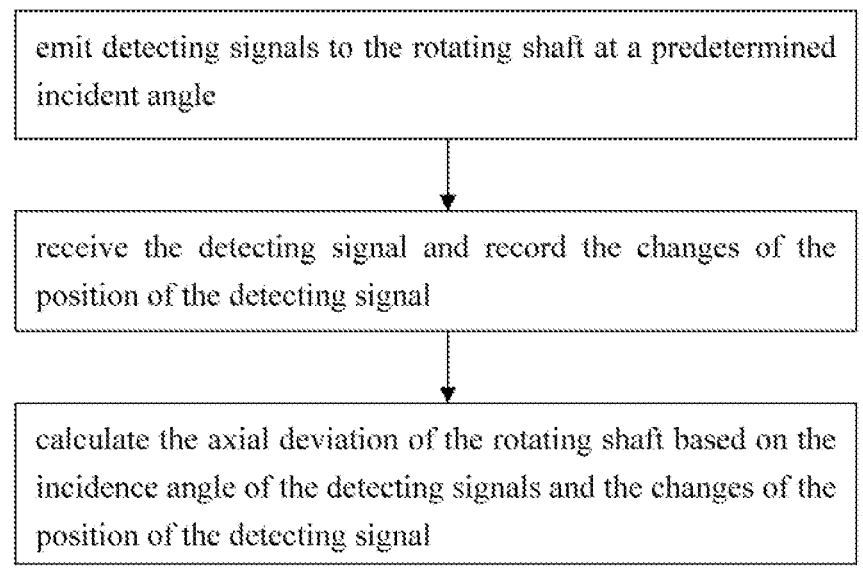
FIG. 4 is a flowchart of a detecting process of the detector of the ultra-precision machining method of FIG. 3.

Referring to FIG. 4, the step of detecting the radial deviation of the rotating shaft further includes following steps: emit detecting signal to the rotating shaft 40 at a predetermined incidence angle; receiving the detecting signal and record the changes of the position of the detecting signal projected on the sensing area of the light receiving device 63. Calculating the radial deviation of the rotating shaft 40 based on the incidence angle of the detecting signal and the changes of the position of the detecting signal projected on the sensing area of the light receiving device 63.

In all of the above steps, the detecting signal are laser signal, and the sensing area of the light receiving device 63 is a sensing area of an optical sensor.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An ultra-precision machining system for machining a workpiece, comprising:
   a worktable;
   a first support device fixed on the worktable;
   a second support device movably mounted on the worktable, the second support device being movable toward or away from the first support device along a horizontal direction;
   a rotating shaft rotatably connected to the first support device, an distal end of the rotating shaft pointing toward the second support device;
   a cutting tool mounted on the second support device and being movable relative to the second support device along a vertical direction;
   a detector fixedly connected to the first support device above the rotating shaft for detecting a radial deviation of the rotating shaft along a vertical direction; and
   a controller configured for calculating the radial deviation of the rotating shaft and adjusting the position of the cutting tool relative to the rotating shaft to counteract the calculated radial deviation of the rotating shaft.

2. The ultra-precision machining system of claim 1, wherein the second support device comprises an adjusting block, the adjusting block is movable along a vertical direction, and the cutting tool is fixed on the adjusting block.

3. The ultra-precision machining system of claim 1, wherein the first support device comprises a holding block mounted on the distal end of the rotating shaft for holding the workpiece.

4. The ultra-precision machining system of claim 1, wherein the detector comprises a supporting arm, a light emitting device and a light receiving device, an end of the supporting arm is fixed on the first support device, the light emitting device and the light receiving device are fixed on the fixing arm, the light emitting device is configured for emitting a light beam to the rotating shaft, the light receiving device is configured for receiving the light reflected by the rotating shaft.

5. The ultra-precision machining system of claim 4, wherein the light receiving device includes an optical sensor configured for generating an analog signal associated with the reflected light.

6. The ultra-precision machining system of claim 5, wherein the controller comprises an A/D convertor, a storage and a processor, the A/D convertor is configured for converting the analog signal to a digital signal, the storage is configured for storing the digital signal converted by the A/D convertor and predetermined information, the processor is configured for calculating the radial deviation of the rotating shaft based on the digital signal stored in the storage.

7. The ultra-precision machining system of claim 6, wherein the storage comprises a RAM and a ROM, the RAM is configured for storing the digital signal converted by the A/D convertor and calculated deviation results, and the ROM is configured for storing the predetermined information.

8. An apparatus for machining a workpiece, comprising:
   a first support;
   a second support;
   a rotating shaft mounted on the first support, the rotating shaft configured for mounting a workpiece thereto, the rotating shaft rotatable about a central axis thereof;
   a cutting tool mounted on the second support, the cutting tool being movable relative to the second support;
   a detector configured for detecting a radial deviation of the rotating shaft along a vertical direction perpendicular to the central axis of the rotating shaft; and
   a controller configured for calculating the radial deviation of the rotating shaft and moving the cutting tool relative to the rotating shaft to counteract the calculated radial deviation of the rotating shaft.

* * * * *